L. E. BURLEIGH.
FLOWER AND PLANT BOX.
APPLICATION FILED APR. 7, 1916.
1,213,331. Patented Jan. 23, 1917.
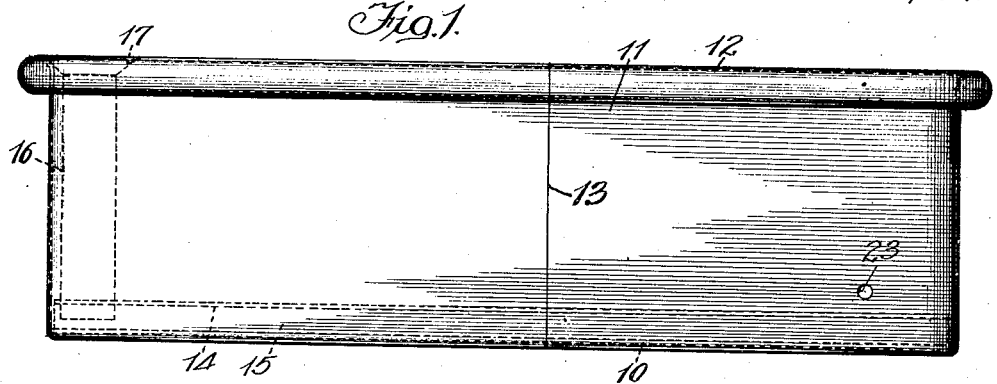
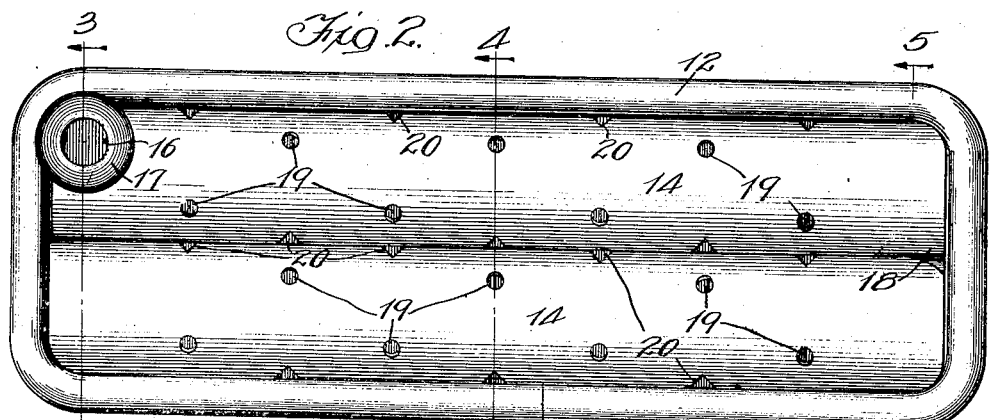
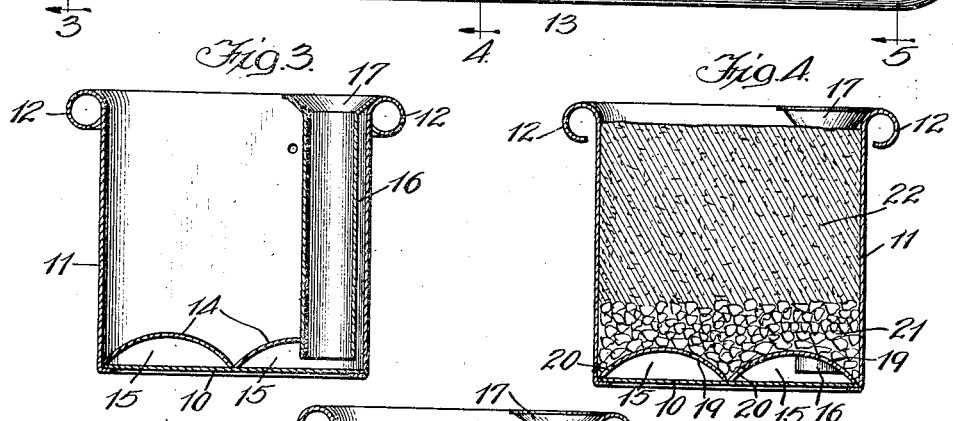
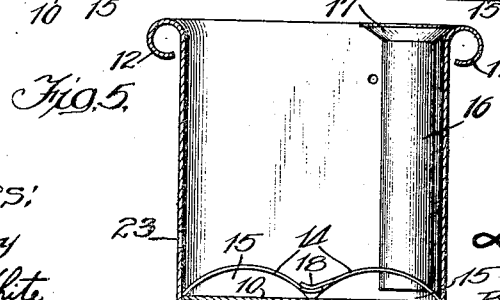
Witnesses:
W. P. Kilroy
Harry R. T. White
Inventor:
Lewis E. Burleigh
By John Howard McElroy
his Atty

UNITED STATES PATENT OFFICE.

LEWIS E. BURLEIGH, OF CHICAGO, ILLINOIS.

FLOWER AND PLANT BOX.

1,213,331.   Specification of Letters Patent.   Patented Jan. 23, 1917.

Application filed April 7, 1916. Serial No. 89,520.

*To all whom it may concern:*

Be it known that I, LEWIS E. BURLEIGH, a citizen of the United States, and a resident of Chicago, in the county of Cook and State of Illinois, have invented certain new and useful Improvements in Flower and Plant Boxes, of which the following is a full, clear, and exact specification.

My invention is concerned with flower and plant boxes, and is designed to produce a device of the class described in which the proper moistening and aeration of the soil in it can be easily and cheaply effected by simply pouring water into the funnel with which it is provided until the proper amount is supplied, which amount will be indicated by the overflow from a suitably located aperture in the side thereof.

To illustrate my invention, I annex hereto a sheet of drawings in which the same reference characters are used to designate identical parts in all the figures, of which—

Figure 1 is a side elevation of the box containing my invention; Fig. 2 is a top plan view of the same; Figs. 3, 4 and 5 are sections on the lines 3—3, 4—4 and 5—5, respectively, the section in Fig. 4, however, being shown as having gravel and dirt inserted in the box.

In carrying out my invention in its preferred form, the bottom proper 10, is made of a single strip of imperforate sheet metal, and the sides 11 are made of a single strip of sheet metal folded under the bottom, as seen in sectional views, and having the rolled edge 12 to strengthen the same, and having its ends preferably joined by the single seam 13. In connection with the true bottom 10, I employ a false bottom 14, which is preferably formed of a plurality, preferably two, of strips of sheet metal extending the length of the bottom of the box, and bent into the arch or curve shown, and soldered into position so as to form two channels 15 to hold a supply of water and to permit the circulation of air beneath the soil. The water is preferably supplied by the tube 16, preferably having the funnel shaped top 17 and preferably secured in one corner of the box with its lower end extending through and secured in an opening formed in one of the strips 14, so that the water supply tube opens beneath the false bottom 14. These two strips are soldered at their edges and ends to the box, and to each other, and to connect them at the end farthest from the water supply tube 16, I preferably turn up a portion of the adjacent ends, as seen at 18, in Figs. 2 and 5. The false bottom is provided with suitable perforations, such as the round holes 19, punched through the body thereof and located at substantially the highest points and over the entire area of the false bottom, and the angular notches 20 cut in the edges and consequently located at the lowest points and likewise over the entire area of the false bottom, so that the water poured into the channel between the two bottoms through the tube 16 is free to rise through the gravel 21, which is preferably piled on top of the false bottom to a point slightly above the aperture 23, which is provided to enable any excess of water to flow out through said aperture, and not get the soil 22 filling the box above the gravel unduly saturated with moisture.

In using the box, the layer of gravel 21 is placed in the bottom and the body of the box filled with the soil 22, and the plants or flowers set out therein in the customary manner, the soil, of course, being fine and loose, so that the air can get to the roots of the plants. When water is required, it is poured in through the funnel top 17 of the tube 16, and spreads out over the under bottom of the box, and is free to ascend upward through the apertures 19 and 20 and stand in the gravel at the height permitted by the drainage aperture 23. As soon as water appears at this aperture, no more should be poured in. The soil draws up the water from the bottom as needed, and the plants are kept in very much better condition by reason of this sub-irrigation than would be possible if the water were poured in on the top of the soil, as that tends to moisten the top soil too much, and cause it to bake and form a hard surface, whereas the sub-irrigation leaves the surface fine and mellow. The water stored in the bottom of the box may be sufficient to cover any period of time during which it would be inconvenient to water the plants, and if occasion demands that the plants be set out of doors where they are exposed to rain storms, no more water could accumulate in the box than is permitted by the height of the overflow outlet 23.

The structure also serves to aerate the soil, and thus keep it soft and mellow, in the following manner: The amount of water permitted by the aperture 23 is very soon drawn up by capillary attraction through the earth filling the interstices in the gravel, the dry earth above it taking up most of the water in a short time. As soon as the water falls below the level of the bottom of the tube 16, which it should do when the soil is properly moistened, air can pass down the tube 16 and fill the space above the water beneath the false bottom, and rise through the apertures 19, thus aerating the soil and keeping it sweet and mellow. As more water is needed, it passes through the apertures 20 at the lowest portion of the false bottom and reaches the soil in the gravel, and is drawn up by capillary attraction as needed, without in any way interfering with the aeration of the soil which goes on at the same time. The air passing down the tube 16 passes directly into the space beneath the adjacent section 14 of the false bottom, and through the passage at 18 to the other section. By raising the top of the passage at 18, and cutting off or notching the portion of the pipe 16 beneath the bottom, the amount of water that can be stored and used simultaneously with the aeration may be increased without otherwise changing the design.

While I have shown and described my invention as embodied in the form which I at present consider best adapted to carry out its purposes, it will be understood that it is capable of modifications, and that I do not desire to be limited in the interpretation of the following claim except as may be necessitated by the state of the prior art.

What I claim as new, and desire to secure by Letters Patent of the United States, is:

In a flower box, the combination with an impervious receptacle, of a perforated false bottom consisting of a plurality of arched sections having recesses at their edges resting on the true bottom and perforations near their highest portions, said recesses and perforations taken together being scattered over substantially the entire area of said bottom so that all the soil therein may be efficiently aerated and watered by capillary action simultaneously from below, and a water and air passage to the outside of the box extending downward through the false bottom and terminating at its lower end at a point above the real bottom, said receptacle having an aperture in the side thereof above the false bottom for draining off any excess of water that may be poured into the passage or deposited on the top of the soil.

In witness whereof, I have hereunto set my hand and affixed my seal, this 4th day of April, A. D. 1916.

LEWIS E. BURLEIGH. [L. S.]

Witness:
JOHN HOWARD MCELROY.